N. W. STORER.
SYSTEM OF CONTROL.
APPLICATION FILED SEPT. 28, 1917.
1,374,535.
Patented Apr. 12, 1921.
4 SHEETS—SHEET 3.
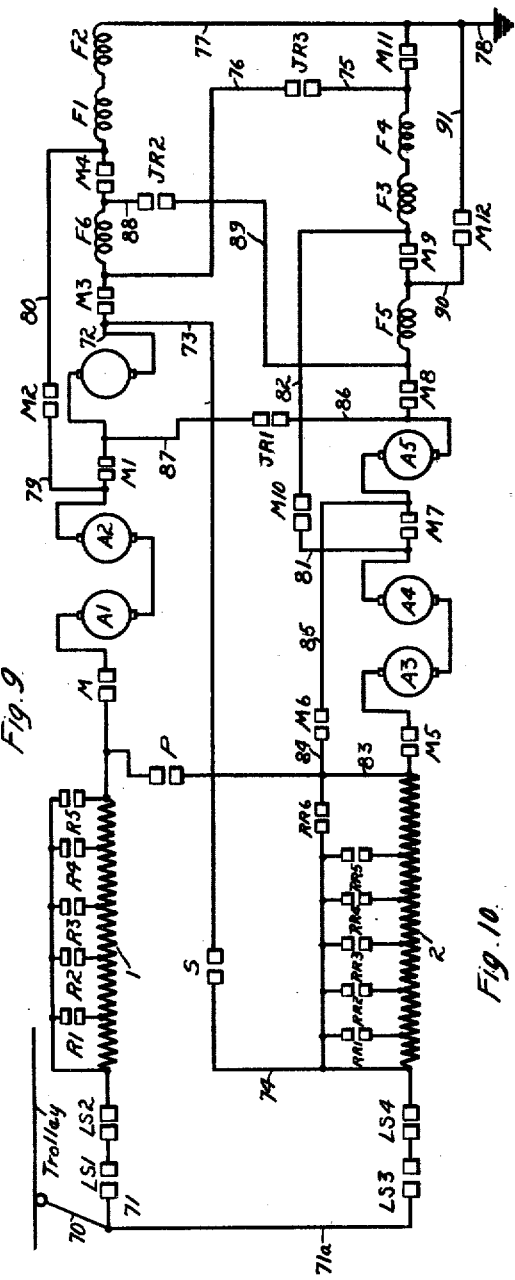
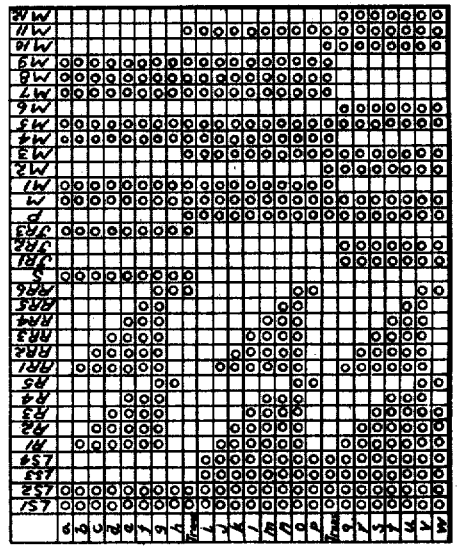
WITNESSES:
T. R. Krear
W. P. Coley
INVENTOR
Norman W Storer
BY
Wesley G. Carr
ATTORNEY

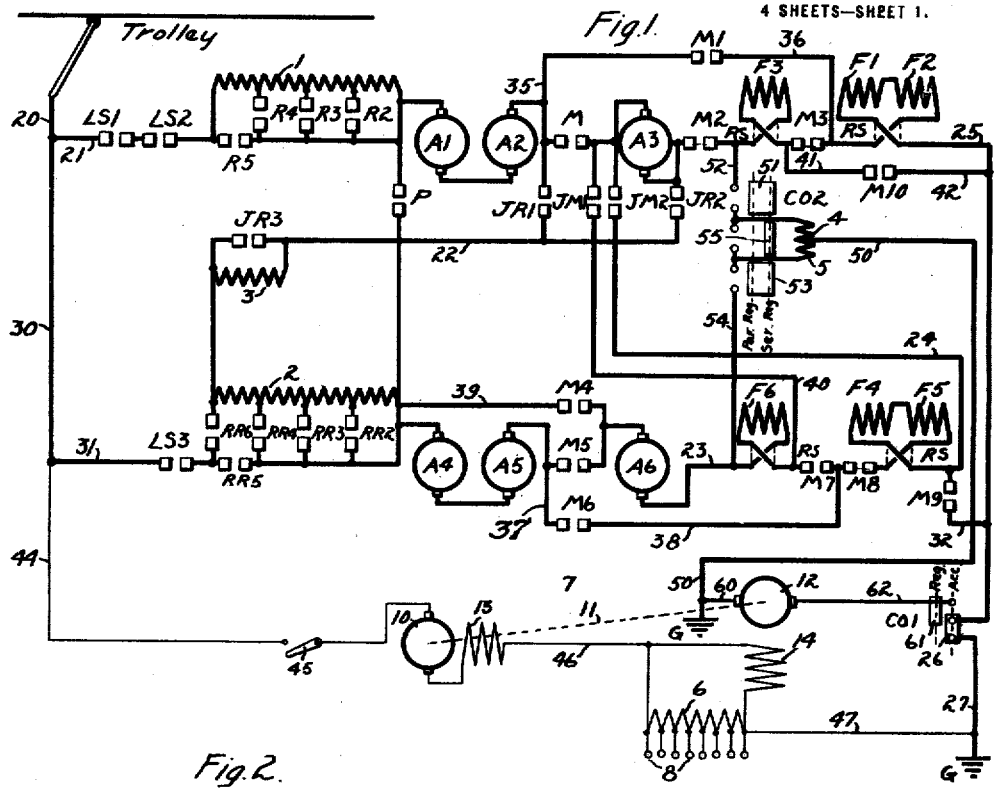

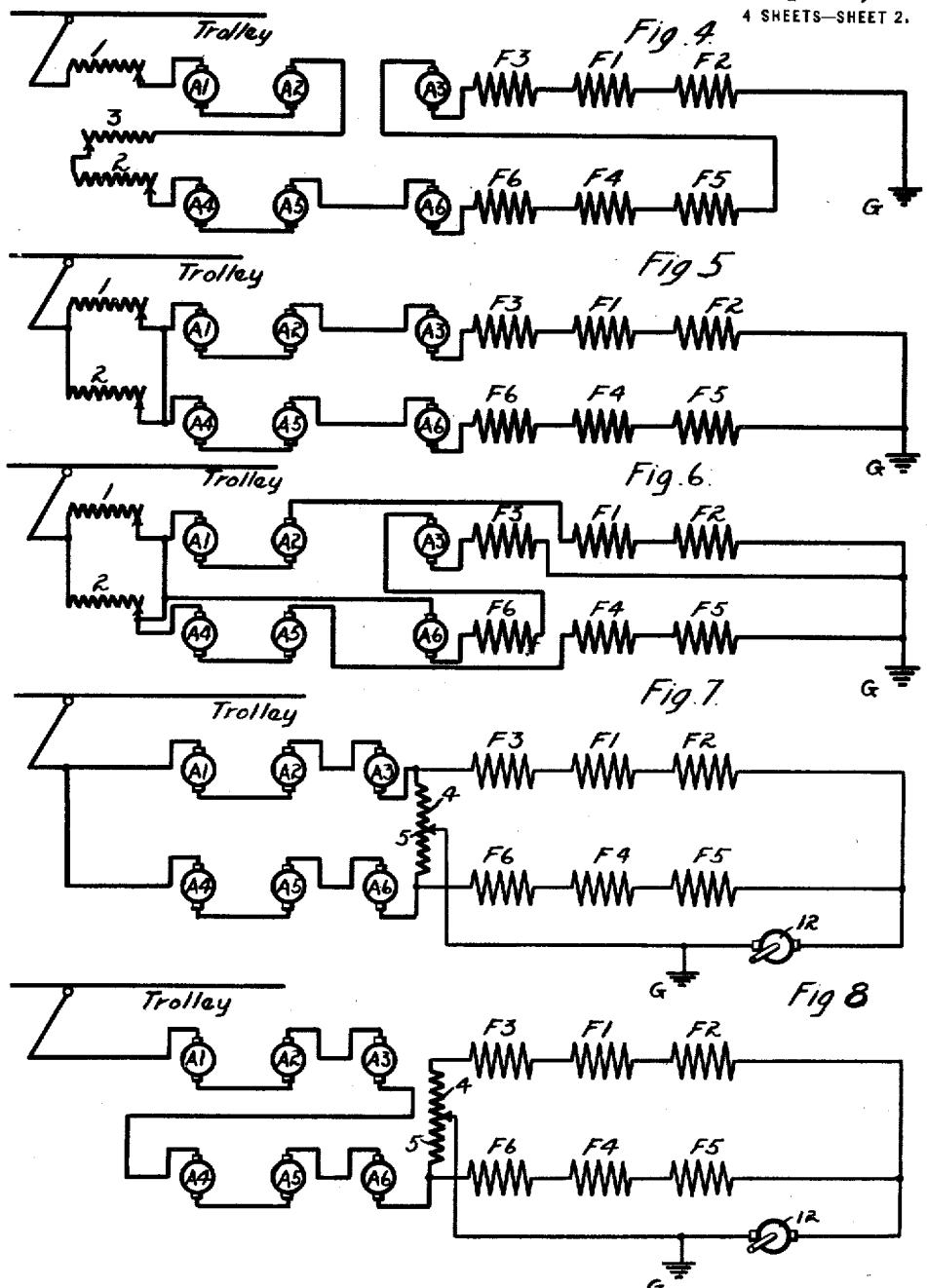

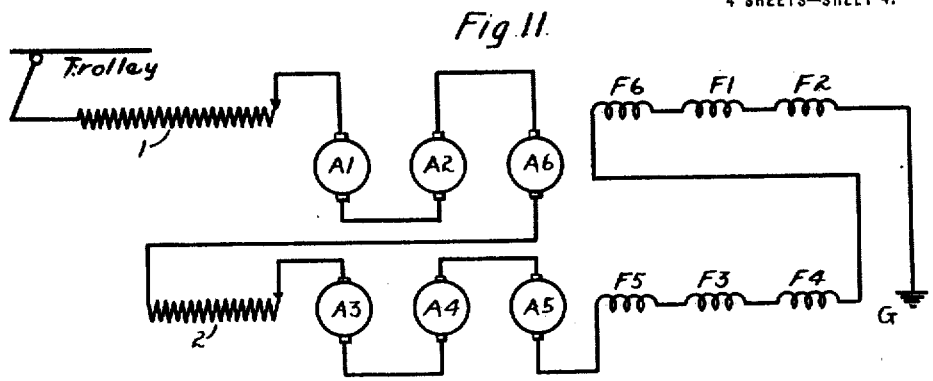
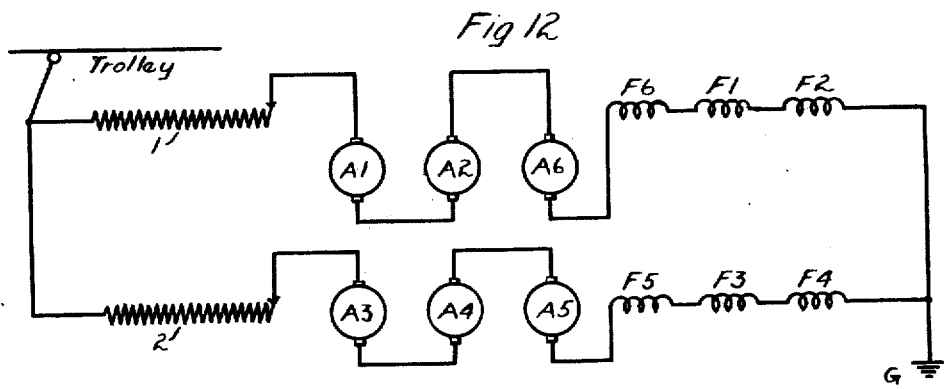
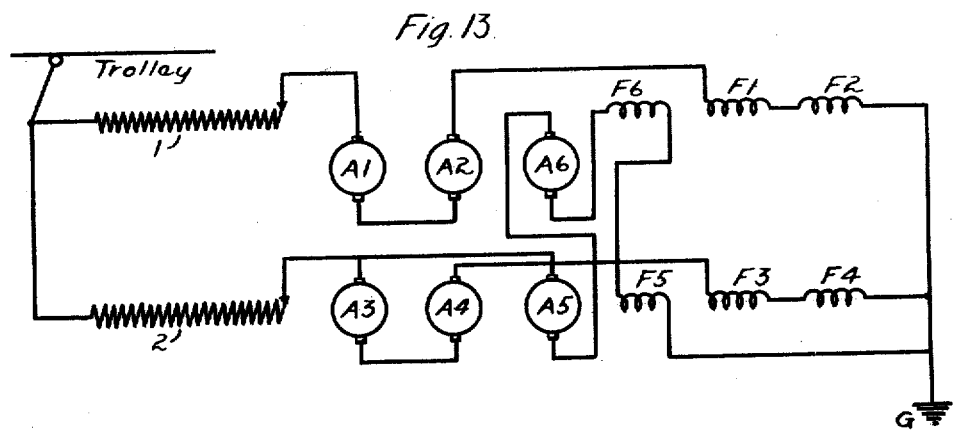

UNITED STATES PATENT OFFICE.

NORMAN W. STORER, OF PITTSBURGH, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,374,535. Specification of Letters Patent. Patented Apr. 12, 1921.

Application filed September 28, 1917. Serial No. 193,687.

*To all whom it may concern:*

Be it known that I, NORMAN W. STORER, a citizen of the United States, and a resident of Pittsburgh, in the county of Allegheny and State of Pennsylvania, have invented a new and useful Improvement in Systems of Control, of which the following is a specification.

My invention relates to systems of control and especially to the control of a relatively large number of dynamo-electric machines that are employed in connection with high-voltage railway circuits, for example.

One object of my invention is to provide a relatively simple and reliable system of the above-indicated character, wherein the machines are arranged in successive groupings that form a non-geometrical series to provide a plurality of speed ranges.

More specifically stated, it is the object of my invention to provide a high-voltage control system embodying a relatively large number of dynamo-electric machines, which number may be represented by $x$, for instance, and for successively and operatively connecting to the supply circuit one group of $x$ machines in series relation, two groups of $\frac{x}{2}$ machines in parallel relation and three groups of $\frac{x}{3}$ machines in parallel relation, the corresponding armatures and field windings being maintained in series relation at all times.

Heretofore, it has been proposed to employ groups of four driving motors for electric vehicles and to connect such motors in the familiar series, series-parallel and parallel relations to effect acceleration of the vehicle. Thus, the motors have been successively grouped in accordance with a geometrical ratio. According to my present invention, however, I employ a larger number of motors, such as 6, for example, and successively group them in accordance with a non-geometrical series, employing one group of six motors in series relation initially, two parallel-related groups of three motors in series relation, secondly, and three parallel-related groups of two motors in series relation finally. The number of parallel paths of the successive groups thus form an arithmetical series. In this way, I not only provide a simple and reliable control system for high-voltage operation wherein a safe voltage per commutator is never exceeded, but, in addition, a smoothly-accelerating and relatively economical system, with respect to the utilization of accelerating resistors, is also produced.

My invention is further adapted to accomplish other minor objects, as will be evident from the following detailed description and as pointed out with particularity in the appended claims.

In the accompanying drawings illustrating my invention, Figure 1 is a diagrammatic view of the main circuits of a system of control embodying the invention; Fig. 2 and Fig. 3 are sequence charts of well-known form that indicate the preferred order of operation of the various switches that are shown in Fig. 1 during the accelerating and the regenerative periods, respectively; Fig. 4 to Fig. 8, inclusive, are simplified diagrammatic views illustrating the circuit connections for the various operating speed ranges; Fig. 9 and Fig. 10 are views, corresponding, respectively, to Fig. 1 and Fig. 2, of a modification of the invention; and Fig. 11 to Fig. 13, inclusive, are simplified diagrammatic views relating to Fig. 9.

Referring to Fig. 1 of the drawings, the system shown comprises suitable supply-circuit conductors Trolley and Ground; a plurality of main dynamo-electric machines respectively having commutator-type armatures A1 to A6, inclusive and field windings F1 to F6, inclusive, of the series type; a conventionally-illustrated reversing switch RS, for suitably interchanging the main-armature and main-field-winding connections to determine the direction of rotation of the machines; a plurality of circuit resistors 1 to 6, inclusive, that are employed to regulate the operation of the system in a manner to be set forth; a motor-generator set 7 that is adapted to be driven from the supply circuit for the purpose of exciting the main field windings during the regenerative period; a change-over switch CO1 having operative positions marked "Acc." and "Reg.," standing for "acceleration" and "regeneration"; a second change-over switch CO2 that is operative only under regenerative conditions and is adapted to occupy two positions respectively marked "Par. reg." and "Ser. reg.", indicating "parallel regeneration" and "series regeneration," respectively; and a plurality of circuit-governing switches: LS1, LS2 and LS3, which effect direct connection to the high-voltage supply conductor Trolley; R2 to R5, inclusive, and RR2 to RR6, inclusive, which are respectively arranged to vary the active circuit values of the accelerating resistors 1 and 2; series-connecting switches JR1, JR2, JR3 and JM2; parallel-connecting switches M1, M4, M6, M10 and JM1; and other switches P, M, M2, M3, M5, M7 and M8 that are employed during one or more of the ranges of operating speeds of the main motors, as subsequently set forth in detail.

As previously mentioned, the resistors 1 and 2 may be gradually short-circuited by the manipulation of the respective sets of switches R2 to R5, inclusive, and RR2 to RR6, inclusive. The resistor 3 is short-circuited by the closure of the switch JR3. Resistors 4 and 5 are connected in both the main-armature and main-field-winding circuits of certain groups of motors during the regenerative period only, for purposes of stabilization. The resistor 6 is provided with a plurality of taps that are connected to control fingers 8, or the equivalent, which may be associated with a control drum of any well-known form for gradually varying the active circuit value of the resistor 6, either manually or automatically, whereby the voltage delivered by the motor-generator set 7 to the main field windings may be gradually increased as the speed of the momentum-driven machines decreases during the braking period, in accordance with a familiar practice.

The motor-generator set 7 is shown as comprising a driving motor armature 10 which is coupled through a shaft 11, for example, with an exciting or generating armature 12. A series related field winding 13 is provided for the driving armature 10, while an exciting field winding 14 for the generating armature 12 is connected in parallel relation to the variable resistor 6.

Inasmuch as the particular auxiliary control system that is utilized to effect the desired main-circuit connections is immaterial to my present invention and may be readily supplied by those skilled in the art, I have not deemed it necessary to illustrate or describe any such auxiliary system. The following description of circuit connections, taken in conjunction with the sequence charts of Fig. 2 and Fig. 3 will, it is believed, constitute a sufficiently complete and thoroughly comprehensible disclosure of my invention:

Assuming that it is desired to effect acceleration of the main machines from the supply circuit, the switches LS1, LS2, JR1, M2, M3, M5, M7, M8 and JM2 are closed, as indicated by step $a$ of Fig. 2, whereby a circuit is established from the trolley through conductors 20 and 21, switches LS1 and LS2, the entire accelerating resistor 1, main armatures A1 and A2, switch JR1, conductor 22, resistor 3, accelerating resistor 2, main armatures A4 and A5, switch M5, main armature A6, conductor 23, main field winding F6, switches M7 and M8, main field windings F4 and F5, conductor 24, switch JM2, main armature A3, switch M2, main field winding F3, switch M3, main field windings F1 and F2, conductor 25, contact segment 26 of the change-over switch CO1, in its possition "Acc.", and conductor 27 to the negative supply-circuit conductor Ground. The main armatures and field windings are thus all connected in series relation across the supply circuit, as indicated in a simplified manner in Fig. 4.

In step $b$ of the control, the switch JR3 is closed, as indicated by the sequence chart, and in the remaining steps $c$ to $j$, inclusive, that correspond to series operation, the various short-circuiting switches that are associated with the resistors 1 and 2 are successively closed to gradually exclude the resistors from circuit and smoothly accelerate the main machines to full series relation.

In position $j$, switches R5, RR5 and RR6 are closed while the remaining short-circuiting switches are opened in readiness for the next control operation, namely, a transition of the six motors to a series-parallel condition, wherein two parallel-related groups of three motors in series relation are utilized. It will be noted, however, that, by reason of the location of the switches R5, RR5 and RR6, the accelerating resistors 1 and 2 are completely short-circuited, even though the other allied switches have been opened.

To effect the transition just recited, switches R5 and RR5 are then opened to temporarily insert the entire accelerating resistors 1 and 2 in the series circuit, and switch M is next closed. In this way, a "bridging" transition circuit is established from one terminal of the switch M, that is, from the low-voltage terminal of the main armature A2, through switch JR1, conductor 22, switch JR3, the accelerating resistor 2, main armatures A4 and A5, switch M5, main armature A6, conductor 26, main field winding F6, switches M7 and M8, main field windings F4 and F5, conductor 24 and switch JM2 to the other terminal of the switch M. As indicated by the sequence chart, series-connected switches JR1, JR3 and JM2 are next opened, while the switch P is closed to directly connect the low-voltage terminals of the accelerating resistors 1 and 2. Furthermore, the line switch LS3 and the switch M9 are closed. In this way, one main circuit is established from the trolley through conductors 20 and 21, line switches LS1 and LS2, accelerating resistor 1, main armatures A1 and A2, switch M, main armature A3, switch M2, main field winding F3, switch M3 and main field windings F1 and F2 to the negative conductor 25.

A second and similar circuit is completed from the conductor 20 through conductors 30 and 31, line switch LS3, accelerating resistor 2, main armatures A4 and A5, switch M5, main armature A6, conductor 23, main field winding F6, switches M7 and M8, main field windings F4 and F5, switch M9 and conductor 32 to the negative conductor 25. The machines are thus grouped in two parallel-related sets of three series-related motors each, the various corresponding armatures and field windings being maintained in series relation. The simplified connections at this time are indicated in Fig. 5 and correspond to step $k$ of the sequence chart Fig. 2. It will be noted that the switch P is closed at this time, whereby the accelerating resistors 1 and 2 are connected in parallel relation. As is well known, a smaller amount of circuit resistance is required under parallel-operating conditions of the motors, and the closure of the switch P effects this desirable condition, while, at the same time, permitting the former sequence of resistor-short-circuiting switches to produce smooth acceleration.

In positions $l$ to $s$, inclusive, the various resistor short-circuiting switches are gradually closed in the previously-described manner to accelerate the motors to the maximum speed that is available with the series-parallel connection just described.

To effect the final transition of the machines to a second series-parallel relation wherein three groups of two series-related motors each are connected in parallel relation across the supply circuit, the short-circuiting switches RR5 and RR6 are first opened to temporarily insert the accelerating resistors 1 and 2 in circuit, and switches M1 and M6 are next closed, thereby, in the one case, short-circuiting the main armature A3 and main field winding F3 through switches M1, M, M2 and M3, and, in the second case, short-circuiting the main armature A6 and main field winding F6 through switches M6, M5 and M7.

Switches M, M3 and M7 are next opened to interrupt the previous connections of the main armatures A3 and A6 to the negative side of the supply circuit, and switches M10 and JM1 are then closed to effect a series relation of the armatures A3 and A6, as about to be traced in detail.

In step $t$ of the control, therefore, the triple series-parallel motor arrangement that is shown in a simplified manner in Fig. 6 obtains.

The switch P remains closed, whereby the two accelerating resistors are connected in parallel relation to jointly effect desirably smooth and efficient acceleration of the three sets of motors by employing the former sequence of the resistor-short-circuiting switches.

Under such conditions, one main circuit is established from the positive conductor 20 through conductor 21, line switches LS1 and LS2, accelerating resistor 1, main armatures A1 and A2, conductor 35, switch M1, conductor 36, main field windings F1 and F2 and thence, through conductor 25, to ground. A second main circuit is established from the positive conductor 20 through conductors 30 and 31, line switch LS3, accelerating resistor 2, where the circuit divides, one branch including main armatures A4 and A5, conductor 37, switch M6, conductor 38, switch M8, main field windings F4 and F5, switch M9 and conductor 32 to the negative conductor 25, and the other branch including conductor 39, switch M4, main armature A6, conductor 23, main field winding F6, conductor 40, switch JM1, main armature A3, switch M2, main field winding F3, conductor 41, switch M10 and conductor 42 to the negative conductor 25.

In the final series-parallel relation of the main motors, therefore, the corresponding armatures and field windings are also maintained in series relation, irrespective of the peculiar re-arrangement of main-armature circuits.

In the remaining control steps $u$ to $z$, inclusive * and #, the various resistor-short-circuiting switches are again closed in the indicated sequence to provide a smooth acceleration of the motors and produce the maximum available speed conditions that correspond to the motor connections.

Assuming that conditions are suitable for regenerative operation of the system, that is, assuming that the vehicle is traveling at a desirably high rate of speed to drive the various main armatures, the motors are disconnected from the supply circuit, after which the change-over switches CO1 and CO2 are actuated to their positions "Reg." and "Par. reg.", respectively, and switches RR6, M, M2, M3, M5, M7, M8 and M9 are closed, as indicated in step $a'$ of the sequence chart, Fig. 3.

An auxiliary circuit, which may be energized during the entire operation of the vehicle, is established from the positive conductor 30 through conductor 44, switch 45, auxiliary driving armature 10, series-related field winding 13, conductor 46, field winding 14 for the auxiliary generating armature 12, which field winding is shunted by a predetermined portion of the variable resistor 6, and conductor 47 to ground. The motor-generator set 7 is thus operated and, if desired, may be utilized for other purposes than that herein illustrated, such as supplying energy to auxiliary control circuits, vehicle lights, etc.

One main-armature or regenerative circuit is established, as soon as the line switches LS1, LS2 and LS3 have been closed, from the supply conductor Ground through conductor 50, where the circuit divides, one branch including stabilizing resistor 4, contact segment 51 of the change-over switch CO2 in its position "Par. reg.," conductor 52, switch M2, main armature A3, switch M, main armatures A2 and A1, resistor 1, line switches LS2 and LS1 and conductor 20 to the trolley. A second branch traverses the stabilizing resistor 5 and contact segment 53 of the change-over switch CO2, conductors 54 and 23, main armature A6, switch M5, main armatures A5 and A4, resistor 2, switches RR6 and LS3 and conductors 31, 30 and 20 to the trolley.

The exciting or main-field-winding circuit is established from the positive terminal of the generating armature 12 through conductors 60 and 50, where the circuit divides, one branch including stabilizing resistor 4, contact segment 51 of the change-over switch CO2, conductor 52, main field winding F3, switch M3, main field windings F1 and F2, conductor 25, contact segment 61 of the change-over switch CO1, in its position "Reg.," and conductor 62 to the negative terminal of the generating armature 12. The other branch traverses stabilizing resistor 5, contact segment 53 of the change-over switch CO2, conductor 54, main field winding F6, switches M7 and M8, main field windings F4 and F5, switch M9 and conductor 32 to the conductor 25.

The main armatures are thus connected, in two groups of three series-related armatures each, across the supply circuit, while the several main field windings are energized in parallel-related groups of three field windings, through the respective stabilizing resistors 4 and 5, from the auxiliary generating armature 12. The simplified circuit diagram is shown in Fig. 7.

It should be noted that the peculiar location of main field windings lends itself particularly well to a simple set of regenerative connections.

It will be understood that, by reason of the connection of the motors in sets of three series-related machines each, at the beginning of the regenerative period, whereas sets of two series-related machines each were utilized at the end of the accelerating period, a relatively low main-field winding excitation is required to produce a combined generated voltage in each armature-circuit sufficient to return energy to the supply circuit. Consequently, the field winding 14 for the auxiliary generating armature 12 is initially shunted across a relatively small section of the variable resistor 6, whereby the voltage delivered by the exciting armature 12 has a relatively low value. As previously mentioned, the voltage of the auxiliary armature is gradually increased during the retardation period to compensate for the gradual reduction of main-machine speed, this result being effected by increasing the active circuit value of the variable resistor 6 in any suitable manner and thus correspondingly increasing the current traversing the exciting field winding 14.

As indicated in steps $b'$ and $c'$ of the regeneration sequence chart, Fig. 3, the various resistor short-circuiting switches are quickly closed after regenerative operation has been begun and the resistor 6 is then varied in the manner just recited.

Transition of the regenerating armatures to series relation, after the speed has dropped to a suitable value, is accomplished in the manner indicated by the transition positions of the sequence chart. In the first place, the general short-circuiting switch RR6 is opened to render the resistor 2 temporarily active, and the switch JR2 is then closed.

The change-over switch CO2 is moved to its position "Ser. reg." at this time to short-circuit the stabilizing resistors 4 and 5, which are not required during series connection of the main armatures.

A bridging circuit, including the main armatures A4, A5 and A6, is thus temporarily established in accordance with the following connections: from one terminal of the switch JR2 through conductor 22, resistors 3 and 2, main armatures A4 and A5, switch M5, main armature A6, conductors 23 and 54, contact segments 53, 55 and 51 of the change-over switch CO2 in its position "Ser. reg.," conductor 52 and switch M2 to the other terminal of the switch JR2.

Switches LS3, R5 and RR5 are then opened to complete the transition of the machines to series relation, as indicated in a simplified manner in Fig. 8. The various resistor-short-circuiting switches are then quickly closed, as indicated in steps $d'$ and $e'$ of the sequence chart, whereafter the variable resistor 6 may be again gradually manipulated to compensate for further decrease of vehicle speed, as indicated by step $f'$ of Fig. 3.

Reference may now be had to Fig. 9, wherein the number and type of main dynamo-electric machines are the same as those illustrated in Fig. 1, but the arrangement thereof is somewhat different, and also the arrangement of main-circuit switches differs from the previously-described system. The main circuits illustrated in Fig. 9 are adapted for use during acceleration only and, consequently, no motor-generator set or the equivalent is shown. The nomenclature of the several switches corresponds, in general, to that employed in connection with Fig. 1 and a complete enumeration of the switches is not deemed necessary.

Assuming that it is desired to effect acceleration of the illustrated motors, the switches LS1, LS2, S, JR3, M, M1, M4, M5, M7, M8 and M9 are closed, as indicated by step *a* of the sequence chart, Fig. 10. Under such circumstances, the machine circuit is established from the trolley through conductors 70 71, line switches LS1 and LS2, the entire resistor 1, switch M, armatures A1 and A2, switch M1, armature A6, conductors 72 and 73, switch S, conductor 74, the entire accelerating resistor 2, switch M5, armatures A3 and A4, switch M7, armature A5, switch M8, field winding F5, switch M9, field windings F3 and F4, conductor 75, switch JR3, conductor 76, field winding F6, switch M4, field windings F1 and F2 and conductors 77 and 78 to the negative supply-circuit conductor Ground.

The simplified circuits for such series connection of the motor elements is shown in Fig. 11.

As indicated by steps *b* to *h*, inclusive, of the sequence chart, the various resistor-short-circuiting switches may be closed in any desired order to gradually effect acceleration of the machines to the maximum speed corresponding to the series connection thereof.

To effect transition of the machines to the first series-parallel relation, wherein two parallel-related sets of three motors each are employed, the resistor short-circuiting switch R5 is first opened to insert the resistor 1 in circuit, and switches P, M3 and M11 are closed. At this time, therefore, a shunting transition circuit is completed from one terminal of the switch M3 through conductor 73, switch S, conductor 74, switches RR6 and M5, armatures A3 and A4, switch M7, armature A5, switch M8 field winding F5, switch M9, field windings F3 and F4, conductor 75, switch JR3 and conductor 76 to the other terminal of the switch M3. The series-connecting switches S and JR3 and the resistor short-circuiting switch RR6 are then opened and line switches LS3 and LS4 are closed to complete the motor transition, in accordance with the following circuits: one circuit is established from the trolley through conductors 70 and 71, line switches LS1 and LS2, resistor 1, switch M, armatures A1 and A2, switch M1, armature A6, conductor 72, switch M3, field winding F6, switch M4 and field windings F1 and F2 to the negative conductor 77.

A similar circuit is completed from the positively energized conductor 70 through conductor 71ª, line switches LS3 and LS4, accelerating resistor 2, switch M5, armatures A3 and A4, switch M7, armature A5, switch M8, field windings F5, switch M9, field windings F3 and F4 and switch M11 to the negative conductor 77. The machines are thus connected in the series-parallel relation that is simply illustrated in Fig. 12.

In the transition position, the switch P is also closed to connect the accelerating resistors 1 and 2 in parallel relation, and the switch is maintained closed throughout the remaining motor operation for the previously-described purpose of suitably reducing the effective resistance value in circuit with the parallel-related sets of motors.

Upon movement of the governing controller through positions *j* to *p*, inclusive, the accelerating resistors 1 and 2 are again gradually short-circuited to increase the machine speed to the maximum value obtainable with the new motor connections.

To effect the second transition of the machines to a series-parallel relation, wherein three parallel-related sets of two motors each are employed, the resistors 1 and 2 are first re-inserted in circuit and switches M2 and M10 are then closed. In this way, the armature A6 is connected through a shunting circuit including switch M1, conductor 79, switch M2, conductor 80, switch M4, field winding F6, switch M3 and conductor 72, while the armature A5 is connected in a similar circuit comprising switch M7, conductor 81, switch M10, conductor 82, switch M9, field winding F5 and switch M8. Switches JR1, JR2, M6 and M12 are next closed and switches M1, M4, M7, M8 and M9 are opened to complete the desired motor transition in accordance with the following circuits, one of which is established from the trolley through conductor 70, line switches LS1 and LS2, resistor 1, switch M, armatures A1 and A2, conductor 79, switch M2, conductor 80 and field windings F1 and F2 to the negative conductor 77.

A second circuit is completed through the line switches LS3 and LS4 and resistor 2, where the circuit divides, one branch including switch M5, armatures A3 and A4, conductor 81, switch M10, conductor 82, field windings F3 and F4 and switch M11 to the negative conductor 77, and the other branch including conductors 83 and 84, switch M6, conductor 85, armature A5, conductor 86, switch JR1, conductor 87, armature A6, conductor 72, switch M3, field winding F6, conductor 88, switch JR2, conductor 89, field winding F5, conductor 90, switch M12, and conductor 91 to the negative conductor 78.

The simplified motor connections, at this time, are illustrated in Fig. 13. The resistors 1 and 2 are then gradually short-circuited, as indicated in the sequence chart, to effect acceleration of the machines to the maximum speed value.

It will be noted that the modified system shown in Fig. 9 maintains the field windings on the ground or negative side of the armatures throughout operation, the advantages of which, such as the relatively simple and inexpensive insulation requirements, are well known in the prior art and need not be set forth here.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. The method of operating a plurality of dynamo-electric machines severally having armatures and field windings from a supply circuit that consists in successively connecting all the machines to said supply circuit in various groupings comprising identical circuits and forming a non-geometrical series and that further consists in maintaining continuous closed-circuit transitions between steps and series connections of corresponding armatures and field windings during such successive steps.

2. The method of operating $x$ dynamo-electric machines severally having armatures and field windings from a supply circuit that consists in successively connecting one group of $x$ machines in series relation, two groups of $\frac{x}{2}$ machines in parallel relation and three groups of $\frac{x}{3}$ machines in parallel relation to said supply circuit and that further consists in maintaining closed-circuit transitions between steps and series connections of corresponding armatures and field windings.

3. In a system of control, the combination with a supply circuit and six dynamo-electric machines respectively having armature windings A1 to A6 and field windings F1 to F6, of means for connecting the several machine windings to the supply circuit in the following groupings to produce three different ranges of operating speeds: A1, A2, A4, A5, A6, F6, F4, F5, A3, F3, F1, and F2; A1, A2, A3, F3, F1 and F2 in parallel relation to A4, A5, A6, F6, F4 and F5; and A1, A2, F1 and F2 in parallel relation to A4, A5, F4 and F5 and also to A6, F6, A3 and F3.

4. In a system of control, the combination with a supply circuit and a plurality of dynamo-electric machines, of a plurality of accelerating resistors initially connected to the supply circuit in common series relation with two groups of machines, the resistors being respectively located between one side of said supply circuit and one machine group and between the two machine groups, means for effecting parallel connection of two circuits each including one of said resistors and one of said machine groups in that order, and a switch for concurrently connecting said resistors in parallel relation.

5. The method of operating a plurality of dynamo-electric machines from a supply circuit that consists in successively connecting the machines to the supply circuit in various groupings comprising parallel paths forming an arithmetical series and that further consists in maintaining closed-circuit transitions between steps.

6. In a system of control, the combination with a supply circuit and a plurality of dynamo-electric machines, of means for operatively connecting the machines to said supply circuit to produce three different ranges of operating speeds, two accelerating resistors, and means for connecting said resistors in circuit in the following manner during the successive speed ranges; first, connecting the resistors in series relation with all of said machines; secondly, connecting the parallel-related resistors in series relation with two parallel-related groups of machines; and thirdly, connecting the parallel-related resistors in series relation with three parallel-related groups of said machines.

7. In a system of control, the combination with a supply circuit and six dynamo-electric machines severally having armatures and field windings, of means for initially connecting all the armatures and field windings to the supply circuit in series relation in a certain order, for subsequently connecting the machines in two parallel groups, respectively including the first, second, and third machines and the fourth, fifth and sixth machines, and for finally connecting the machines in three parallel groups, respectively including the first and second machines, the fourth and fifth machines, and the sixth and third machines, all of the field windings being maintained on a predetermined side of all of the armatures throughout the machine operation.

8. The method of operating a plurality of dynamo-electric machines from a supply circuit that consists in successively connecting all the machines across the supply circuit in continuous closed-circuit groupings comprising identical paths forming an arithmetical series.

In testimony whereof, I have hereunto subscribed my name this 18th day of Sept. 1917.

NORMAN W. STORER.